United States Patent

Benjamin (10) Patent No.: US 9,637,029 B2
(45) Date of Patent: May 2, 2017

(54) ADJUSTMENT DEVICE (71) Applicant: GNS KV GMBH, Bielefeld (DE)

(72) Inventor: Milto Benjamin, Guetersloh (DE)

(73) Assignee: GNS KV GmbH, Bielefeld (DE)

( * ) Notice: Subject to any disclaimer, the term of this patent is extended or adjusted under 35 U.S.C. 154(b) by 0 days.

(21) Appl. No.: 14/665,130

(22) Filed: Mar. 23, 2015

(65) Prior Publication Data

US 2015/0266397 A1 Sep. 24, 2015

(30) Foreign Application Priority Data

Mar. 24, 2014 (DE) .................. 10 2014 103 989

(51) Int. Cl.
| | |
|---|---|
| *F16D 41/10* | (2006.01) |
| *B60N 2/16* | (2006.01) |
| *F16D 67/02* | (2006.01) |
| *B60N 2/44* | (2006.01) |

(52) U.S. Cl.
CPC ............ *B60N 2/168* (2013.01); *B60N 2/167* (2013.01); *B60N 2/1615* (2013.01); *B60N 2/444* (2013.01); *F16D 41/105* (2013.01); *F16D 67/02* (2013.01)

(58) Field of Classification Search
CPC ...... B60N 2/168; B60N 2/1615; B60N 2/167; B60N 2/444; F16D 41/105; F16D 41/08; F16D 41/086; F16D 67/02
See application file for complete search history.

(56) References Cited

U.S. PATENT DOCUMENTS

| 6,230,867 B1 | 5/2001 | Schwarzbich | |
|---|---|---|---|
| 6,273,233 B1 * | 8/2001 | Denis .................... | B60N 2/2257 192/223.2 |
| 2003/0173182 A1 * | 9/2003 | Kim ...................... | B60N 2/167 192/223.2 |
| 2005/0006193 A1 * | 1/2005 | Kim ...................... | B60N 2/167 192/15 |
| 2009/0273218 A1 * | 11/2009 | Park ....................... | B60N 2/167 297/284.6 |
| 2012/0279819 A1 * | 11/2012 | Kawai .................. | B60N 2/1615 192/55.2 |
| 2012/0305359 A1 * | 12/2012 | Sato ..................... | B60N 2/1615 192/45.001 |
| 2013/0119212 A1 | 5/2013 | Benjamin et al. | |

FOREIGN PATENT DOCUMENTS

| EP | 0979179 | 2/2000 | |
|---|---|---|---|
| KR | WO 2014021582 A1 * | 2/2014 | ............ B60N 2/165 |
| WO | WO 2012/013234 | 2/2012 | |

* cited by examiner

*Primary Examiner* — Huan Le
*Assistant Examiner* — Lori Wu
(74) *Attorney, Agent, or Firm* — Michael J. Striker (57) ABSTRACT

An adjustment device for adjusting seats includes a rotatable drive element, a rotatable output element, a first clamping element freewheel that blocks the output element continuously in different positions in both adjustment directions and that is released by a release element and a second clamping element freewheel that is coupled via the release element to the first clamping element freewheel, blocks the output element continuously in different positions in both adjustment directions and is released by an actuating element. The drive element is pre-tensioned in a middle position via two springs acting in different directions and the two springs pre-tension the actuating element in a middle position.

17 Claims, 7 Drawing Sheets

ADJUSTMENT DEVICE

CROSS-REFERENCE TO A RELATED APPLICATION

The invention described and claimed hereinbelow is also described in German Patent Application 10 2014 103 989.0, filed on Mar. 24, 2014. The European Patent Application, the subject matters of which is incorporated herein by reference, provides the basis for a claim of priority of invention under 35 U.S.C. 119(a)-(d).

BACKGROUND OF THE INVENTION

The present invention relates an adjustment device, for example, for adjusting seats.

EP 979 179 discloses a seat adjuster, in which a brake is provided between a fixed part and an adjustable part, to be able to block the two parts continuously in both adjustment directions. The brake can be released via a release element, to then be adjusted in one of the two directions using an adjustment body. An additional locking unit, which acts step-by-step, latches to lock the blocked position. Such latching is perceived to be annoying by the user, since, on the one hand, latching noises occur and on the other hand, latching cannot take place in intermediate positions. In addition, numerous parts are required for the pre-tensioning of the latch, which makes the installation complex.

WO 2012/013234 discloses an adjustment mechanism in which two clamping locks connected in series are provided, where each implements a freewheel brake. The two clamping locks comprise clamping elements, which enable continuous adjustment and blocking in both adjustment directions. The two clamping locks are coupled to one another in this case via a disengagement element, so that after the blocking of an output element by the first clamping lock, the second clamping lock can be switched into a freewheel position, to move an actuating lever back into a starting position. In this case, the actuating lever is pre-tensioned via a first lock spring in a starting position and the disengagement element is pre-tensioned via a second lock spring in a starting position. The two lock springs are arranged in series in the axial direction of the output shaft, so that a relatively large amount of construction space is required in the axial direction. In addition, the problem exists that one lock spring acts on the triggering element and the other lock spring acts on the lever adapter. The reset takes place relatively imprecisely due to tolerances and play.

SUMMARY OF THE INVENTION

The present invention overcomes the shortcomings of known arts, such as those mentioned above.

To that end, the present invention provides an adjustment device, which has a compact structure and enables a precise adjustment of a drive element in relation to an output element.

According to an embodiment of the invention, the adjustment device comprises a first clamping element freewheel and a second clamping element freewheel, by each of which one output element is blocked and released continuously in different positions in both adjustment directions. A release element is provided to release the first clamping element freewheel and an actuating element is provided to release the second clamping element freewheel. The drive element is pre-tensioned in a middle position in this case via two springs acting in different directions. The two springs also pre-tension the actuating element in a middle position. Thus, independently of the rotational direction of the drive element, one of the two springs is used for the reset into a starting position, i.e., a middle position. The respective other spring is used to reset the actuating element into a middle position, so that depending on the rotational direction of a spring, either the drive element or the actuating element is pre-tensioned in a middle position. A more compact structure thus results and the production of the adjustment device with only a few parts is enabled. The pre-tension of the actuating element is implemented essentially without play in this case, since the actuating element is directly moved and is pre-tensioned in a middle position during a movement of the drive element.

The first and the second clamping element freewheels can be implemented in each case as a clamping lock, in which clamping elements are provided between an outer ring and an inner ring, enabling continuous blocking in both adjustment directions. Like clamping locks are described in detail, for example, in WO 2012/013234 and are referred to hereafter as a clamping element freewheel, since a freewheel also can be achieved in addition to the blocking function.

Preferably, during a movement of the drive element in a first rotational direction, the drive element is pre-tensioned by a first of the two springs in the middle position and the actuating element is pre-tensioned by the other, second spring in the middle position. In contrast, if the drive element is moved in a second rotational direction, which is opposite to the first rotational direction, the drive element is pre-tensioned by the second spring in the middle position and the actuating element is pre-tensioned by the first spring in the middle position. Thus, depending on the rotational direction, the drive element and the actuating element can be pre-tensioned by the first spring or the second spring.

For a compact structure of the adjustment device and easy installation, the springs can be implemented as coiled springs. The springs are preferably held in a curve in a receptacle of a housing. In the middle position of the drive element and the actuating element, the springs are held with their end sides on a stop. In this case, a projection of the drive element is arranged between the end sides of the springs and a projection of the actuating element is arranged between two opposing end sides of the springs. Thus, with rotationally-fixed fixation of the actuating element on the drive element, an adjustment and blocking operation, which is essentially without play, is caused via the first and second clamping body freewheels.

In an embodiment of the invention, the output element has an axle and the drive element has a ring arranged around the axle. The ring forms a part of the second clamping body freewheel in this case, so that the drive part acts directly via the ring on the second clamping body freewheel, to reduce the number of parts. Of course, it also is possible to implement the drive element as the axle and the output element as the ring, to provide an adjustment device according to the invention.

The springs arranged in the curved receptacles on the housing are installed from a first side in the receptacles. Furthermore, at least one slot is provided on the curved receptacles, through which a projection is guided, which presses against an end side of the springs. The actuating element and the drive element are thus installed compactly inside the housing.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
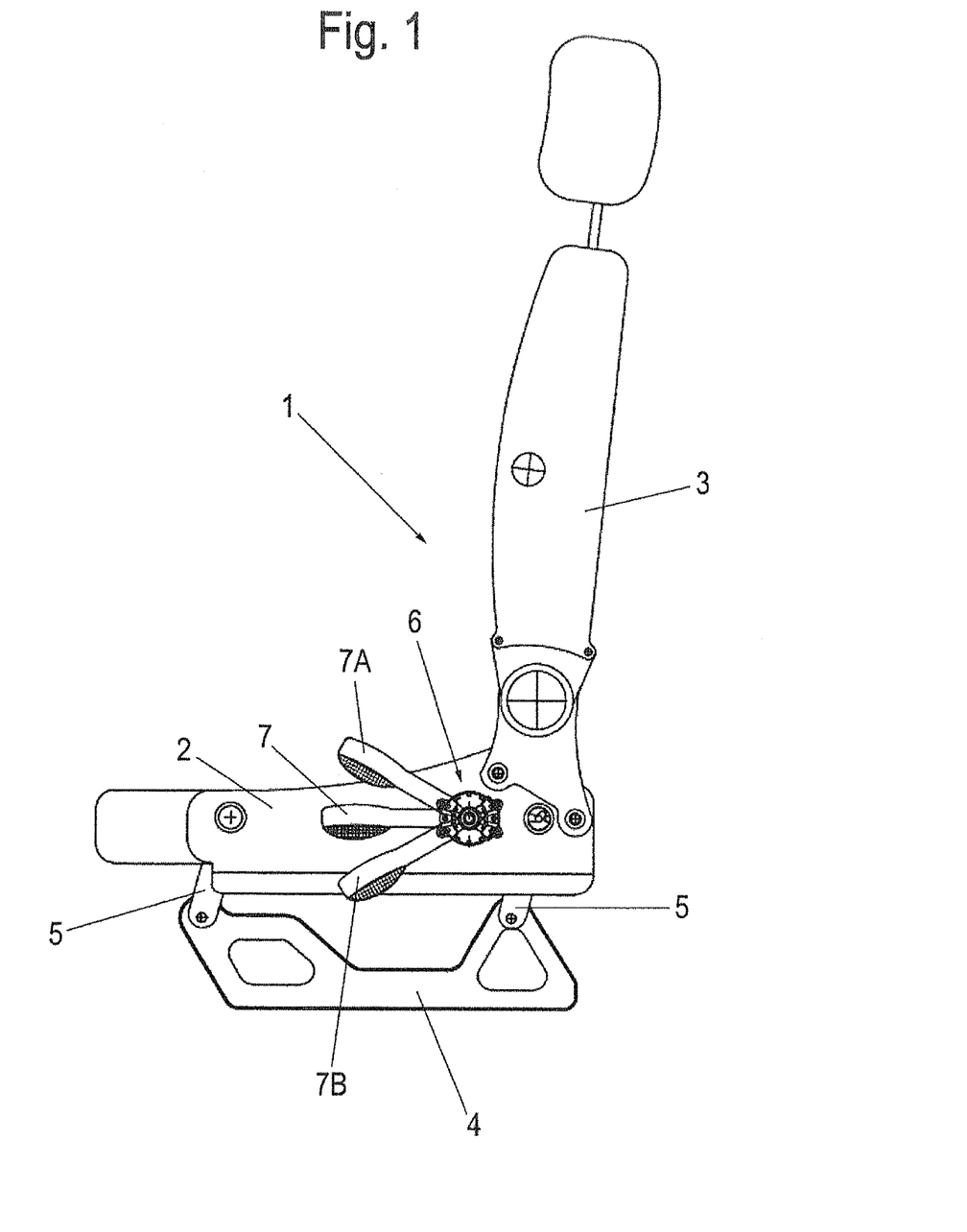
FIG. 1 presents a view of a seat having an adjustment device according to the invention.

A vehicle seat 1 is shown in FIG. 1 to comprise a seat body 2, on which a backrest 3 is mounted to be pivotable. The seat body 2 is supported on a framework 4, wherein the seat body 2 is held on the framework 4 via two parallel levers 5. An adjustment device 6, including a drive lever 7 that is rotatable about a horizontal axis in both directions, is installed on the seat body 2. If the drive lever 7 is pivoted upward into a position 7A, pivoting of the lever 5 clockwise can be initiated via the adjustment device 6, whereby the seat surface 2 is lowered. If the drive lever 7 is pivoted downward into position 7B, rotating of the lever 5 counterclockwise is caused via the gearing, so that the seat body 2 is raised.

Figure 2:
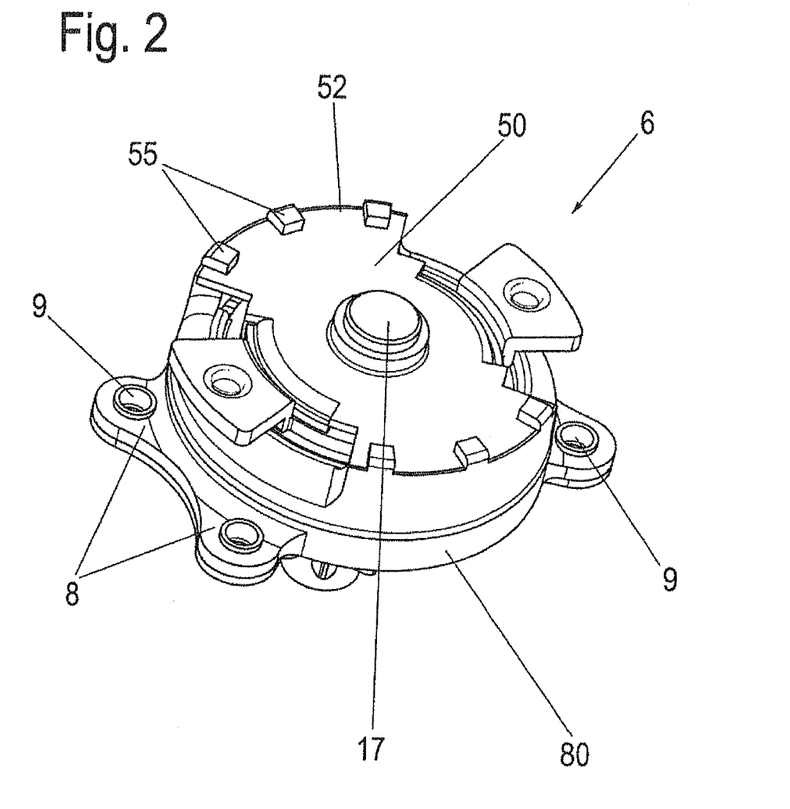
FIG. 2 presents a perspective view of the adjustment device according to the invention.
Figure 3:
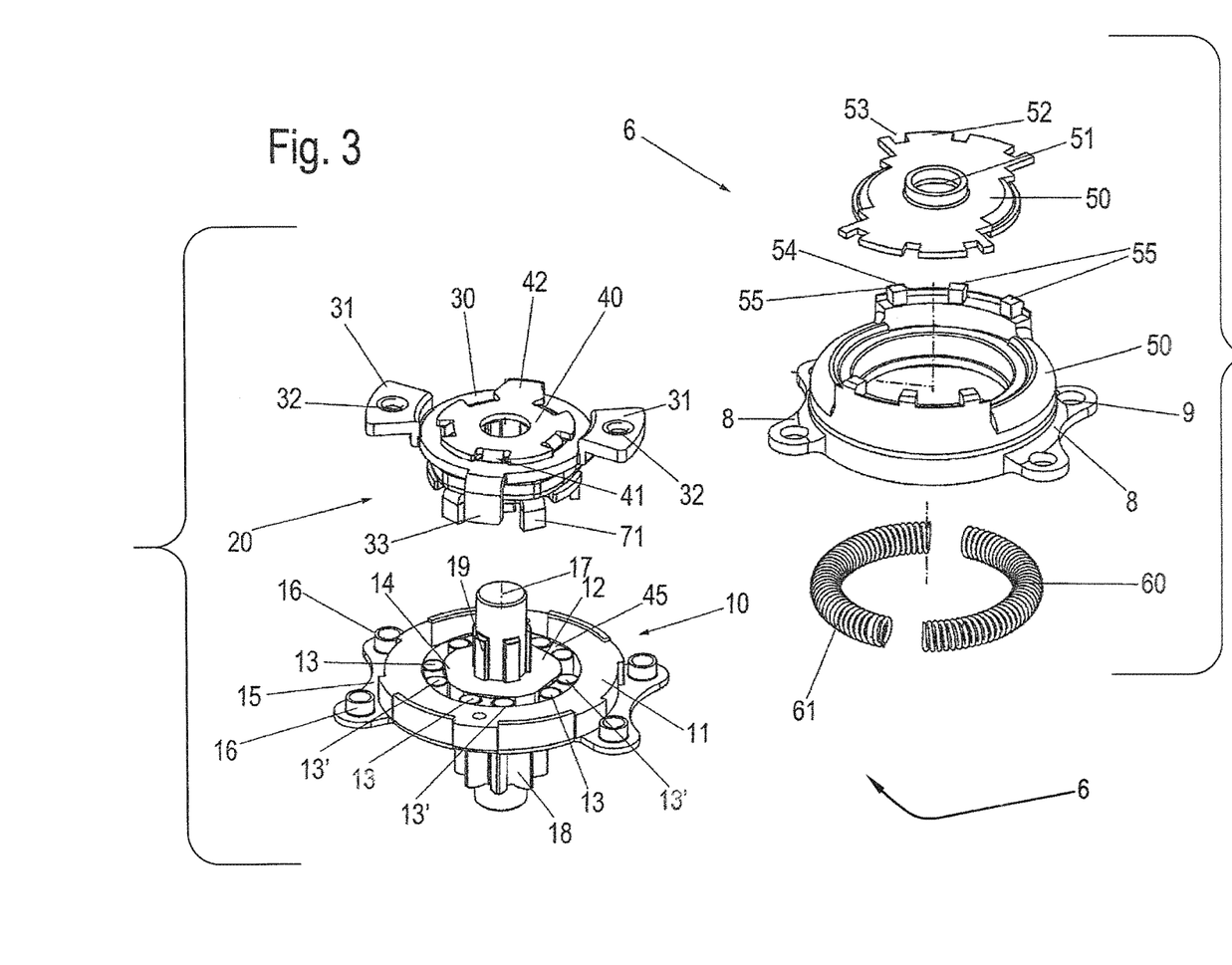
FIG. 3 presents a perspective exploded illustration of the adjustment device of FIG. 2.

In FIGS. 2 and 3, the adjustment device 6 is shown. The adjustment device 6 comprises a housing 80, which has a flange 8 with openings 9 on opposing sides, to fix the housing 80 on the seat body 2. The housing 80 is closed on the upper side by a cover 50, which is implemented as plate-shaped and has webs 52, which engage between projections 55 of the housing. The housing 80 and the cover 50 are penetrated by an axle 17.

As shown in FIG. 3, the axle 17 has a smooth-walled section and a middle section having radially protruding wedges 19, which are used for the rotationally-fixed fixation of an inner ring 12 of a first clamping body freewheel 10. Furthermore, a protruding pinion 18 is provided on the axle 17, which is engaged with a gearing, in particular a toothed rocker, which is implemented on a lever 5 or a part connected to the lever 5, to be able to perform a vertical adjustment of the seat body 2 via the pinion 18.

The first clamping element freewheel 10 comprises cylindrical clamping elements 13 and 13', which press against a cylindrical internal surface of an outer ring 11. Furthermore, the clamping bodies 13 and 13' press against the inner ring 12, which has a round contour, and has a flattening 14 in each case in the region of the clamping elements 13 and 13'. A block 45 made of an elastic material is inserted between the clamping elements 13 and 13'. The inner ring 12 can be blocked and released in both directions in relation to the outer ring 11 via the clamping elements 13 and 13'.

In a starting position, inner ring 12 and outer ring 11 are blocked in relation to one another, since in each case one of the clamping elements 13 and 13' causes a blocking in one direction. If the clamping element 13 is moved slightly by a release element 70 having projections 71 in a circumferential direction, the release is achieved and the blocking is canceled. The inner ring 12 can then be rotated in relation to the outer ring 11 in a first rotational direction. If the release element 70 having the projections 71 is moved in the opposite direction and the clamping element 13' is shifted, a movement of the inner ring 12 in relation to the outer ring 11 in the opposite direction is released.

The outer ring 11 is connected rotationally-fixed in this case to a housing lower part, which is implemented as plate-shaped and has outwardly protruding webs 15. Upwardly protruding sleeves 16 are provided on the webs 15, which engage in the openings 9 of the housing 80, so that housing lower part and housing 80 are fixed in a rotationally-fixed manner on one another.

The adjustment device 6 according to the invention furthermore comprises a second damping element freewheel 20, which is released via an actuating element 40. The second clamping element freewheel 20 comprises in this case an outer ring 30, which has two radially protruding projections 31 having openings 32, on which the drive lever 7 is fixed.

The first clamping element freewheel 10 and the second clamping element freewheel 20 are arranged inside the housing 80, which is closed using the cover 50. The cover 50 has an internal opening 51 for leading through one end of the axle 17. Furthermore, recesses 53 are provided between the webs 52, in which the projections 55, which protrude from a support surface 54, engage.

Figure 4:
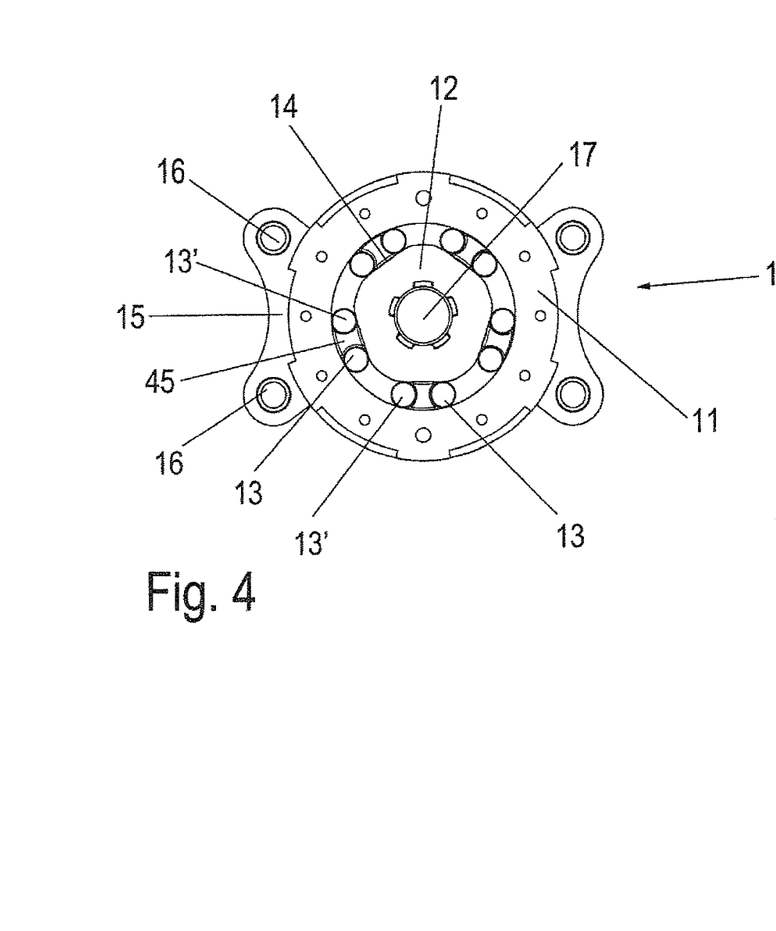
FIG. 4 presents a top view of a first clamping element freewheel of the adjustment device of FIG. 2.
Figure 5:
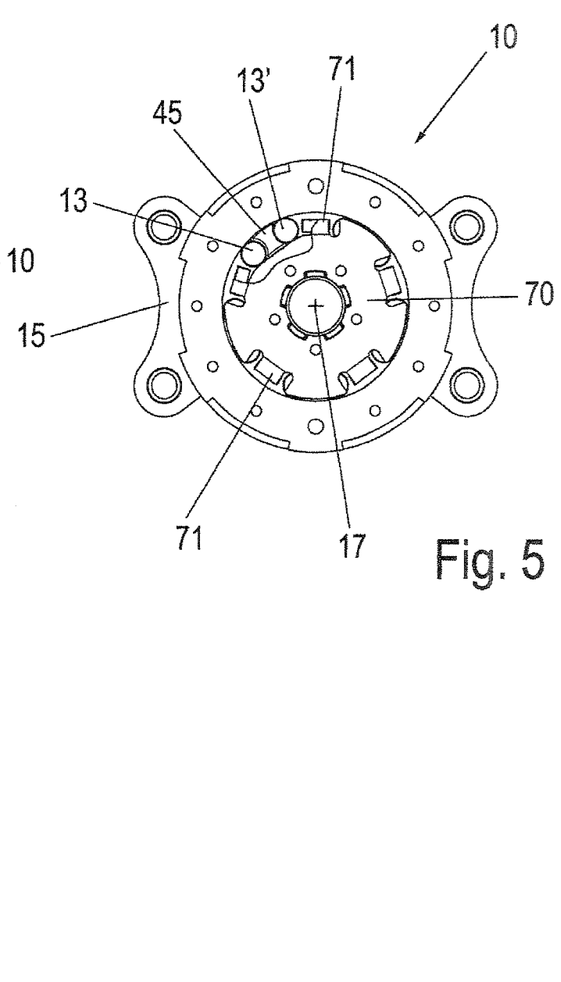
FIG. 5 presents a view of the first clamping body freewheel of FIG. 4 with a release element.

FIG. 4 shows the first clamping element freewheel 10 in a top view. The inner ring 12 comprises a nonround contour having flattenings 14, at each of which a pair made of a clamping element 13 and a clamping element 13' is provided. An elastic block 45 is arranged between the clamping elements 13 and 13' of a pair. Between two clamping elements 13 and 13', at which no elastic body 45 is provided, i.e., between two adjacent pairs of clamping elements 13, 13', a projection 71 of a release element 70 engages in each case, wherein the release element 70 is implemented as essentially ring-shaped and is connected on the inner side in a rotationally-fixed manner to the axle 17. The projections 71 are bent over and engage essentially in a formfitting manner or with little play between the clamping elements 13 and 13', as shown in FIG. 5.

Figure 6:
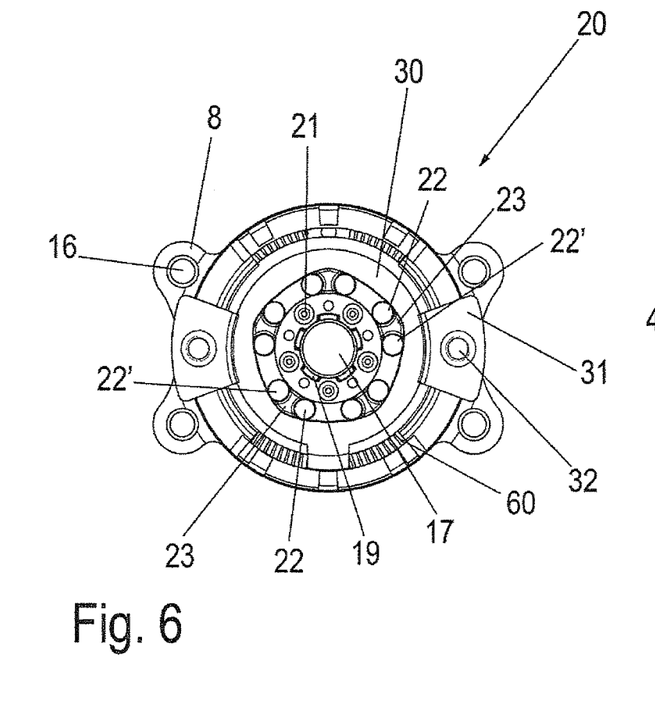
FIG. 6 presents a top view of a second clamping body freewheel of the adjustment device.

The second clamping element freewheel 20 is shown in FIG. 6. The clamping element freewheel 20 comprises an inner ring 21, which has receptacles for the wedges 19 of the axle 17 on the inner side and is therefore connected in a rotationally-fixed manner to the axle 17. The inner ring 21 is implemented as cylindrical on the outer circumference and presses against clamping elements 22 and 22'. An outer ring 30 is provided around the clamping elements 22 and 22', which implements a cross section deviating from the cylindrical body, to jam the clamping elements 22 and 22' in opposite directions. An elastic block 23 is provided between the clamping elements 22 and 22'. In a starting position, the inner ring 21 is blocked in relation to the ring 30 in opposite directions, wherein a release of the blocking occurs when in each case one of the clamping elements 22 or 22' is shifted against the force of the elastic block 23, so that then the ring 30 can be rotated in relation to the inner ring 21 in one direction. The function of the second clamping element freewheel 20 is therefore similar to the first clamping element freewheel 10. In the second clamping element freewheel 20, the outer ring 30 is coupled to the drive lever 7 via the projections 31.

Figure 7:
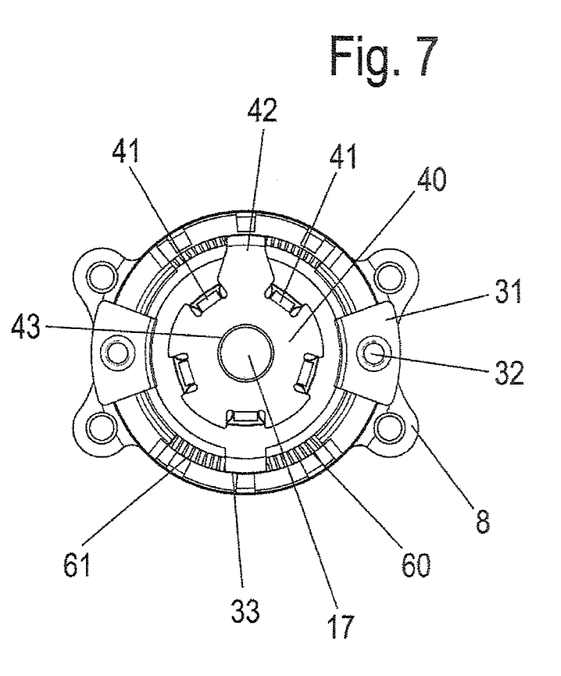
FIG. 7 presents a view of the second clamping element freewheel with an actuating element.

In FIG. 7, an essentially disk-shaped actuating element 40 is placed on the second clamping element freewheel 20. The actuating element 40 is ring-shaped and comprises projections 41 protruding perpendicularly downward, which engage between two clamping elements 22 and 22', to displace one of the clamping elements 22 or 22' depending on the rotational direction and thus achieve a release. Furthermore, the actuating element 40 is provided with an internal cylindrical opening 43, through which the axle 17 is guided. A protruding web 42 is implemented on one side of the actuating element 40, which engages between two springs 60 and 61, as will be explained hereafter.

Figures 8, 9:
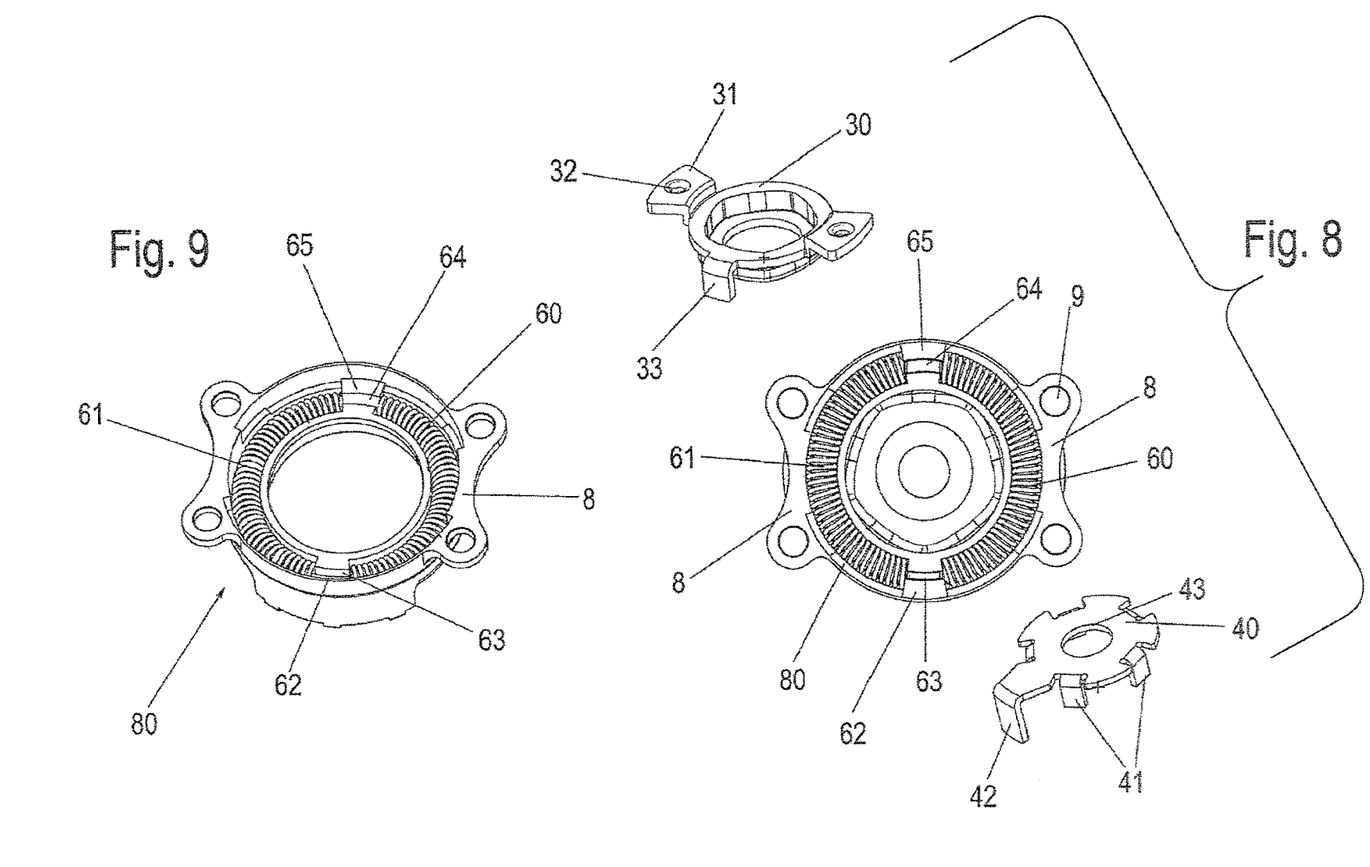
FIG. 8 presents a perspective exploded illustration of a housing of the adjustment device.
FIG. 9 presents a view of the housing of the adjustment device with the springs.

FIG. 8 shows the housing 80 with the two springs 60 and 61. The springs 60 and 61 are implemented as coiled springs and are arranged essentially in a semicircle inside the housing 80. The springs 60 and 61, which are compression springs, and are each held in a curve in a receptacle, wherein one end side of the springs 60 and 61 is supported in each case on a first stop 62 or an opposing stop 65. A slot 63 is provided on the stop 62 and a slot 64 is provided on the stop 65. The actuating element 40 engages with the projection 42 in the slot 64. On the opposite side, a projection 33 on the ring 30 engages in the slot 63. During the rotation of the ring 30, firstly the second clamping element freewheel 20 is unlocked and then moves, via the clamping element 22 or 22', the actuating element 40, which is moved via the projections 41 with the clamping elements 22 and 22'. The projection 42 thus also moves in the rotational direction of the ring 30 against the force of one of the springs 60 or 61.

FIG. 9 shows the housing 80 with the springs 60 and 61, which are held in curved receptacles. The stops 62 and 65 also can be seen, on each of which a slot 63 or 64 is implemented. The springs 60 and 61 are arranged essentially in a plane perpendicular to the longitudinal direction of the axle 17, the springs 60 and 61 at least overlap in this plane, so that a more compact structure is obtained.

Figure 10:
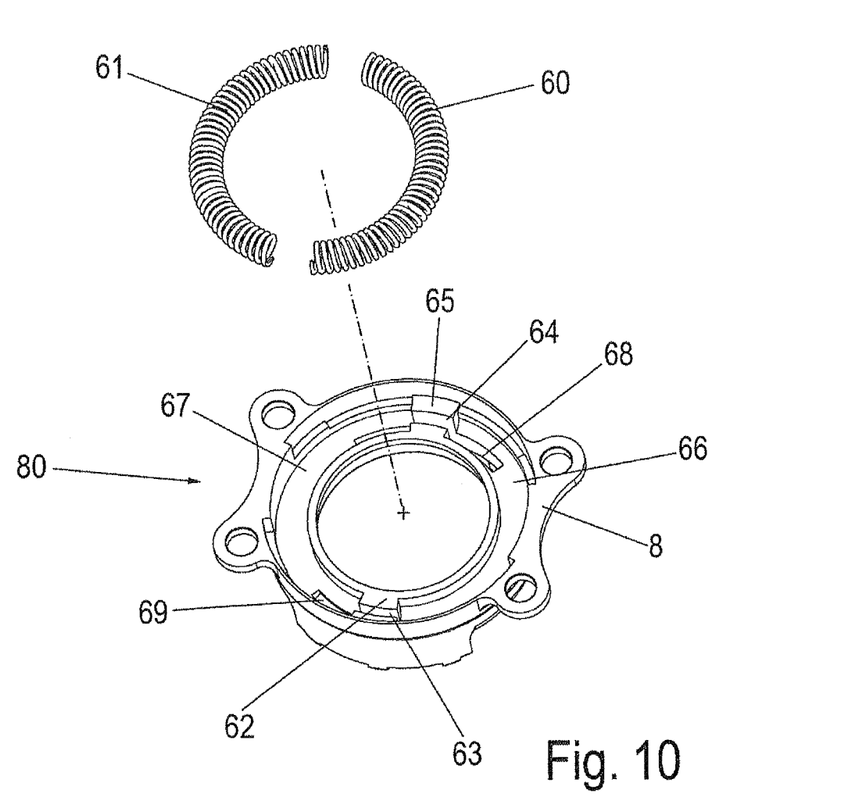
FIG. 10 presents a perspective view of the housing with the springs during the installation.

FIG. 10 shows the housing 80 in an exploded illustration. The housing 80 comprises curved receptacles 66 and 67, in each of which a spring 60 or 61, respectively, is received. As FIG. 10 shows, the slot 64 is not only located in the region of the stop 65, but rather also extends as the slot 68 into the receptacle 66 and the receptacle 67. The actuating element 40 can thus be moved from a middle position, in which the projection 42 is arranged in the region of the stop 65, in both rotational directions along the slot 68. On the opposite side, the slot 63 is provided on the stop 62, which extends on opposite sides as the slot 69. The projection 33 of the ring 30 is thereby rotated out of the middle position against the force of the springs 60 or 61 in opposite directions.

In the event of a movement of the drive lever 7 downward from a middle position, an adjustment operation is initiated, in that the output element is rotated using the pinion 18. If the drive lever 7 is then let loose, one of the springs 60 or 61 causes a reset into the blocked position, so that a manual adjustment operation of the seat body 2 may be carried out. Vice versa, the drive lever 7 is then moved upward out of the middle position, to cause an adjustment of the seat body upward, wherein then the pinion 18 is blocked in the adjusted position and the drive lever 7 is pivoted back into its middle position by the force of one of the springs 60 or 61.

LIST OF REFERENCE NUMERALS 1 seat
2 seat body
3 backrest
4 framework
5 lever
6 adjustment device
7 drive lever
7A position
7B position
8 flange
9 opening
10 clamping element freewheel
11 outer ring
12 inner rings
13, 13' clamping elements
14 flattening
15 web
16 sleeve
17 axle
18 pinion
19 wedge
20 clamping element freewheel
21 inner ring
22, 22' clamping elements
23 block
30 outer ring
31 projection
32 opening
33 projection
40 actuating element
41 projection
42 web/projection
43 opening
45 block
50 cover
51 opening
52 web
53 recess
54 support surface
55 projection
60 spring
61 spring
62 stop
63 slot
64 slot
65 stop
66 receptacle
67 receptacle
68 slot
69 slot
70 release element
71 projection
80 housing As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. An adjustment device for adjusting seats, comprising:
    a rotatable drive element;
    a rotatable output element;
    a first clamping element freewheel that blocks the output element continuously in different positions in both adjustment directions and that is released by a release element; and
    a second clamping element freewheel that comprises clamping elements and an outer ring, and that is coupled via the release element to the first clamping element freewheel, blocks the output element continuously in different positions in both adjustment directions and is released by an actuating element;
    wherein the outer ring is provided around the clamping elements of the second clamping element freewheel;
    wherein the outer ring comprises radially protruding projections on which a drive lever is fixed;
    wherein the outer ring displays a cross-section that deviates from a cross-section of a cylindrical body and thereby jams the clamping elements of the second clamping element freewheel in opposite directions;
    wherein the drive element is pre-tensioned in a middle position via two springs acting in different directions;
    wherein the two springs also pre-tension the actuating element in a middle position;
    wherein a projection of the drive element is arranged between two first end sides of the two springs; and
    wherein a projection of the actuating element is arranged between two opposing second end sides of the two springs.

2. The adjustment device according to claim 1, wherein during a movement of the drive element in a first rotational direction, the drive element is pre-tensioned by a first of the two springs in the middle position and the actuating element is pre-tensioned by a second of the two springs in the middle position.

3. The adjustment device according to claim 2, wherein during a movement of the drive element in a second direction opposite to the first direction, the drive element is pre-tensioned by the second spring in the middle position and the actuating element is pre-tensioned by the first spring in the middle position.

4. The adjustment device according to claim 1, wherein the two springs are implemented as coiled springs.

5. The adjustment device according to claim 1, wherein the two springs are held in a curved shape in respective first and second curved receptacles of a housing.

6. The adjustment device according to claim 5, wherein at least one slot is provided on the curved receptacles, through which the projection of the drive element is guided, which presses against an end side of a spring of the two springs.

7. The adjustment device according to claim 5, wherein in the middle position, the two springs are held with spring end sides on respective stops in the housing.

8. The adjustment device according to claim 1, wherein the two springs are implemented as compression springs.

9. The adjustment device according to claim 1, wherein the output element has an axle and wherein the outer ring is arranged around the axle.

10. The adjustment device according to claim 1, wherein the two springs are arranged in a plane perpendicular to the longitudinal direction of an axle of the drive element or the output element.

11. The adjustment device according to claim 1, wherein the two springs are arranged in a housing and wherein the two opposing first end sides of the two springs are supported respectively on a first stop of the housing or an opposing second stop of the housing.

12. The adjustment device according to claim 11, wherein a first slot is provided on the first stop and a second slot is provided on the second stop.

13. The adjustment device according to claim 12, wherein the actuating element engages with the projection in the second slot.

14. The adjustment device according to claim 12, wherein the actuating element engages with the projection in the first slot.

15. The adjustment device according to claim 12, wherein the housing comprises first and second curved receptacles in which one each of the two springs is received.

16. The adjustment device according to claim 15, wherein the second slot extends as a slot into the first receptacle and the second receptacle.

17. The adjustment device according to claim 16, wherein the first slot extends as a slot into the first receptacle and the second receptacle.

* * * * *